US011631840B2

United States Patent
Herle (10) Patent No.: US 11,631,840 B2
(45) Date of Patent: Apr. 18, 2023

(54) SURFACE PROTECTION OF LITHIUM METAL ANODE

(71) Applicant: Applied Materials, Inc., Santa Clara, CA (US)

(72) Inventor: Subramanya P. Herle, Mountain View, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 112 days.

(21) Appl. No.: 16/658,286

(22) Filed: Oct. 21, 2019

(65) Prior Publication Data

US 2020/0343533 A1  Oct. 29, 2020

Related U.S. Application Data

(60) Provisional application No. 62/839,117, filed on Apr. 26, 2019.

(51) Int. Cl.
*H01M 4/1395* (2010.01)
*H01M 4/04* (2006.01)
(Continued)

(52) U.S. Cl.
CPC ....... *H01M 4/1395* (2013.01); *H01M 4/0404* (2013.01); *H01M 4/382* (2013.01);
(Continued)

(58) Field of Classification Search
CPC .. H01M 4/1395; H01M 4/0404; H01M 4/382; H01M 4/628; H01M 10/0562; H01M 2004/027; H01M 2300/0068
See application file for complete search history.

(56) References Cited

U.S. PATENT DOCUMENTS

| 4,299,890 A | 11/1981 | Rea et al. |
| 5,415,954 A | 5/1995 | Gauthier et al. |

(Continued)

FOREIGN PATENT DOCUMENTS

| CN | 107154499 | 9/2017 |
| EP | 1236231 A1 | 9/2002 |

(Continued)

OTHER PUBLICATIONS

EPO English machine translation of JP 2001351611 originally published to Shizuka Kenji on Dec. 21, 2001 (Year: 2001).*

(Continued)

*Primary Examiner* — Cynthia H Kelly
*Assistant Examiner* — Niara Trant
(74) *Attorney, Agent, or Firm* — Patterson + Sheridan, LLP (57) ABSTRACT

A method and apparatus for forming metal electrode structures, more specifically lithium-containing anodes, high performance electrochemical devices, such as primary and secondary electrochemical devices, including the aforementioned lithium-containing electrodes. In one implementation, the method comprises forming a lithium metal film on a current collector. The current collector comprises copper and/or stainless steel. The method further comprises forming a protective film stack on the lithium metal film, comprising forming a first protective film on the lithium metal film. The first protective film is selected from a bismuth chalcogenide film, a copper chalcogenide film, a tin chalcogenide film, a gallium chalcogenide film, a germanium chalcogenide film, an indium chalcogenide film, a silver chalcogenide film, a dielectric film, a lithium fluoride film, or a combination thereof.

20 Claims, 4 Drawing Sheets

(51) Int. Cl.
  *H01M 4/38* (2006.01)
  *H01M 10/0562* (2010.01)
  *H01M 4/62* (2006.01)
  *H01M 4/02* (2006.01)

(52) U.S. Cl.
  CPC ....... *H01M 4/628* (2013.01); *H01M 10/0562* (2013.01); *H01M 2004/027* (2013.01); *H01M 2300/0068* (2013.01)

(56) References Cited

U.S. PATENT DOCUMENTS

| | | | |
|---|---|---|---|
| 6,207,327 | B1 | 3/2001 | Takada et al. |
| 6,733,924 | B1 | 5/2004 | Skotheim et al. |
| 6,797,428 | B1 | 9/2004 | Skotheim et al. |
| 7,247,408 | B2 | 7/2007 | Skotheim et al. |
| 7,745,048 | B2 | 6/2010 | Hwang et al. |
| 9,758,855 | B2 | 9/2017 | Deppisch et al. |
| 2002/0012846 | A1 | 1/2002 | Skotheim et al. |
| 2002/0182488 | A1 | 12/2002 | Cho et al. |
| 2004/0058232 | A1 | 3/2004 | Kim et al. |
| 2004/0072066 | A1 | 4/2004 | Cho et al. |
| 2005/0008935 | A1 | 1/2005 | Skotheim et al. |
| 2005/0095504 | A1 | 5/2005 | Kim et al. |
| 2005/0130043 | A1 | 6/2005 | Gao et al. |
| 2005/0186469 | A1 | 8/2005 | De Jonghe et al. |
| 2006/0222954 | A1* | 10/2006 | Skotheim ............ H01M 4/0421 429/246 |
| 2006/0228468 | A1 | 10/2006 | Lain et al. |
| 2009/0107834 | A1 | 4/2009 | Ye et al. |
| 2009/0191460 | A1 | 7/2009 | Fujiwara et al. |
| 2009/0297935 | A1 | 12/2009 | Visco et al. |
| 2010/0104948 | A1 | 4/2010 | Skotheim et al. |
| 2010/0156353 | A1 | 6/2010 | Iyer et al. |
| 2010/0190051 | A1 | 7/2010 | Aitken et al. |
| 2010/0216028 | A1* | 8/2010 | Sato ........................ H01G 9/02 429/254 |
| 2011/0318553 | A1 | 12/2011 | Lotz |
| 2014/0001576 | A1 | 1/2014 | Gandikota et al. |
| 2014/0127569 | A1 | 5/2014 | Maeda et al. |
| 2015/0010696 | A1 | 1/2015 | Yakovleva et al. |
| 2015/0109234 | A1 | 4/2015 | Lotz et al. |
| 2015/0318555 | A1 | 11/2015 | Oku et al. |
| 2016/0308243 | A1 | 10/2016 | Herle et al. |
| 2017/0069894 | A1 | 3/2017 | Ishihara et al. |
| 2017/0214054 | A1 | 7/2017 | Cui et al. |
| 2017/0279108 | A1 | 9/2017 | Herle |
| 2017/0324073 | A1 | 11/2017 | Herle |
| 2017/0365854 | A1 | 12/2017 | Gopalakrishnannair et al. |
| 2017/0373304 | A1* | 12/2017 | Kim .................... H01M 4/0471 |
| 2018/0083303 | A1 | 3/2018 | Platt et al. |
| 2018/0301693 | A1* | 10/2018 | Choi ........................ H01M 4/62 |
| 2018/0358659 | A1* | 12/2018 | Subbaraman ......... H01M 4/661 |
| 2019/0013516 | A1 | 1/2019 | Herle et al. |
| 2019/0074509 | A1 | 3/2019 | Hirai et al. |
| 2019/0088987 | A1 | 3/2019 | Herle |
| 2019/0140266 | A1 | 5/2019 | Yun |
| 2019/0140267 | A1 | 5/2019 | Gopalakrishnan Nair et al. |
| 2020/0203714 | A1 | 6/2020 | Chae et al. |
| 2020/0274124 | A1 | 8/2020 | Thielen et al. |

FOREIGN PATENT DOCUMENTS

| | | | |
|---|---|---|---|
| EP | 3685460 | A1 | 7/2020 |
| JP | 2001351611 | A * | 12/2001 |
| JP | 2004-527888 | A | 9/2004 |
| JP | 2005-129535 | A | 5/2005 |
| JP | 2012-516549 | A | 7/2012 |
| KR | 10-2004-0026208 | A | 3/2004 |
| KR | 20050038905 | A | 4/2005 |
| KR | 20120032044 | A | 4/2012 |
| KR | 20180062963 | A | 6/2018 |
| KR | 20180082902 | A | 7/2018 |
| WO | 01-39302 | A1 | 5/2001 |
| WO | 01-39303 | A1 | 5/2001 |
| WO | 02095849 | A2 | 11/2002 |
| WO | 2012/146312 | A1 | 11/2012 |
| WO | 2015/003123 | A1 | 1/2015 |
| WO | 2016/112333 | A1 | 7/2016 |
| WO | 2017/131997 | A1 | 8/2017 |
| WO | WO 2017131997 | * | 3/2018 |
| WO | 2019-094121 | A1 | 5/2019 |

OTHER PUBLICATIONS

International Search Report and Written Opinion for International Application No. PCT/US2018/050625 dated Feb. 28, 2019.
International Search Report and Written Opinion for International Application No. PCT/US2020/024687 dated Jul. 15, 2020.
Korean Office Action dated Oct. 8, 2021 for Application No. 10-2020-7011471.

* cited by examiner

SURFACE PROTECTION OF LITHIUM METAL ANODE

CROSS-REFERENCE TO RELATED APPLICATIONS

This application claims benefit of U.S. provisional patent application Ser. No. 62/839,117, filed Apr. 26, 2019, which is incorporated herein by reference in its entirety.

BACKGROUND

Field

Implementations described herein generally relate to metal electrodes, more specifically lithium-containing anodes, high performance electrochemical devices, such as primary and secondary electrochemical devices, including the aforementioned lithium-containing electrodes, and methods for fabricating the same.

Description of the Related Art

Rechargeable electrochemical storage systems are currently becoming increasingly valuable for many fields of everyday life. High-capacity electrochemical energy storage devices, such as lithium-ion (Li-ion) batteries, are used in a growing number of applications, including portable electronics, medical, transportation, grid-connected large energy storage, renewable energy storage, and uninterruptible power supply (UPS). Traditional lead/sulfuric acid batteries often lack the capacitance and are often inadequately cyclable for these growing applications. Both lithium-ion and subsequently, solid-state batteries, are thought to provide the best options for meeting increasing performance demands.

Lithium provides an exceptional anode material for both lithium-ion and solid-state batteries. Lithium is a light alkali metal with a high voltage and theoretical capacity. However, like the heavy element homologs of the first main group, lithium is characterized by a strong reactivity with a variety of substances. Lithium reacts violently with water, alcohols and other substances that contain protic hydrogen, often resulting in ignition. Lithium is unstable in air and reacts with oxygen, nitrogen and carbon dioxide. Lithium is normally handled under an inert gas atmosphere (noble gases such as argon) and the strong reactivity of lithium necessitates that other processing operations also be performed in an inert gas atmosphere. As a result, lithium provides several challenges when it comes to processing, storage, and transportation.

Protective surface treatments have been developed for lithium metal. One method of protective surface treatment of lithium metal includes coating the lithium metal with a wax layer, for example, polyethylene wax. However, a large amount of coating agent is typically applied which interferes with subsequent processing of the lithium metal film.

Another method of protective surface treatment proposes producing stabilized lithium metal powder ("SLMP") with a continuous carbonate coating, polymer coating, for example, polyurethanes, PTFE, PVC, polystyrene and others. However, these polymer coatings can cause problems when prelithiating electrode materials.

Therefore, there is a need for methods and systems for the deposition and processing of lithium metals in energy storage systems.

SUMMARY

Implementations described herein generally relate to metal electrodes, more specifically lithium-containing anodes, high performance electrochemical devices, such as primary and secondary electrochemical devices, including the aforementioned lithium-containing electrodes, and methods for fabricating the same. In one implementation, a method is provided. The method comprises forming a lithium metal film on a current collector. The current collector comprises copper and/or stainless steel. The method further comprises forming a protective film stack on the lithium metal film, comprising forming a first protective film on the lithium metal film. The first protective film is selected from a bismuth chalcogenide film, a copper chalcogenide film, a tin chalcogenide film, a gallium chalcogenide film, a germanium chalcogenide film, an indium chalcogenide film, a silver chalcogenide film, a dielectric film, a lithium fluoride film, or a combination thereof.

In another implementation, an anode electrode structure is provided. The anode electrode structure comprises a current collector comprising copper and/or stainless steel, a lithium metal film formed on the current collector, and a protective film stack formed on the lithium metal film. The protective film stack comprises a first protective film formed on the lithium metal film. The first protective film is selected from a bismuth chalcogenide film, a copper chalcogenide film, a tin chalcogenide film, a gallium chalcogenide film, a germanium chalcogenide film, an indium chalcogenide film, a silver chalcogenide film, a dielectric film, a lithium fluoride film, or a combination thereof. The protective film stack further comprises a second protective film formed on the first protective film. The second protective film is selected from a lithium fluoride (LiF) film, a metallic film, a carbon-containing film, or a combination thereof.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes anode electrodes, high performance electrochemical cells and batteries including the aforementioned anode electrodes, and methods for fabricating the same. Certain details are set forth in the following description and in FIGS. 1-6 to provide a thorough understanding of various implementations of the disclosure. Other details describing well-known structures and systems often associated with electrochemical cells and batteries are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein will be described below in reference to a reel-to-reel coating system, such as TopMet™, SMARTWEB®, TopBeam™, all of which are available from Applied Materials, Inc. of Santa Clara, Calif. Other tools capable of performing vapor deposition processes (e.g., physical vapor deposition (PVD) processes, chemical vapor deposition (CVD) processes, atomic layer deposition (ALD) processes) may also be adapted to benefit from the implementations described herein. In addition, any system enabling the vapor deposition processes described herein can be used to advantage. The apparatus description described herein is illustrative and should not be construed or interpreted as limiting the scope of the implementations described herein. It should also be understood that although described as a reel-to-reel process, the implementations described herein may also be performed on discrete substrates. In some implementations, the reel-to-reel coating systems can be combined to form device stack.

As described herein, flexible substrates can be considered to include among other things, films, foils, webs, strips of plastic material, metal, paper, or other materials. Typically, the terms "web," "foil," "strip," "substrate" and the like are used synonymously.

Energy storage devices, for example, Li-ion batteries, typically include a positive electrode (e.g., cathode), and a negative electrode separated by a polymer separator with a liquid electrolyte. Solid-state batteries also typically include a positive electrode (e.g., cathode) and a negative electrode (e.g., anode) but replace both the polymer separator and the liquid electrolyte with an ion-conducting material.

Graphite anodes are the current state of the art but the industry is moving from the graphite based anode to silicon blended graphite anodes to increase cell energy density. However, silicon blended graphite anodes often suffer from irreversible capacity loss that occurs during the first cycle. Thus, there is a need for methods for replenishing this first cycle capacity loss. The current generation of batteries uses graphite anodes, a porous polymer separator, and a liquid electrolyte. The liquid electrolyte typically includes additives, which form a solid electrolyte interface (SEI) in-situ during formation on the electrode. The SEI helps determine cycle life of the battery. The energy density of the state of the art graphite anode based battery is limited to around 650 Wh/l. The energy density of a silicon powder blended graphite anode will help boost the energy density to greater than 700 Wh/l. There is a need for manufacturing technology to compensate for first cycle irreversible capacity loss of lithium associated with silicon anodes. Thus, the ability to use lithium in next generation batteries including both Li-ion batteries and solid-state batteries becomes increasingly substantial. However, lithium technology presents significant device integration challenges such as handling lithium in dry room ambient, suitable surface protection technology, and the need to suppress or eliminate lithium metal dendrite formation during battery cycling. From the electrochemical device perspective, an interface material, which not only helps to prevent surface oxidation but also should help in improving device performance is desirable.

Using the implementations described herein, the deposited lithium metal, either single-sided or dual-sided, can be protected during winding and unwinding of the reels downstream. Deposition of one or more thin protective films as described herein has several advantages. In some implementations, the one or more protective films described herein provide adequate surface protection for shipping, handling, and storage as well as avoiding surface reactions of lithium during device integration. In some implementations, the one or more protective films described herein are compatible with lithium ions and reduce impedance for ions to move across. In some implementations, the one or more protective films described herein are ion-conducting and thus may be incorporated into the formed energy storage device. In some implementations, the one or more protective films described herein can also help suppress or eliminate lithium dendrites, especially at high current density operation. In some implementations, the use of protective films described herein reduces the complexity of manufacturing systems and is compatible with current manufacturing systems.

Figure 1:
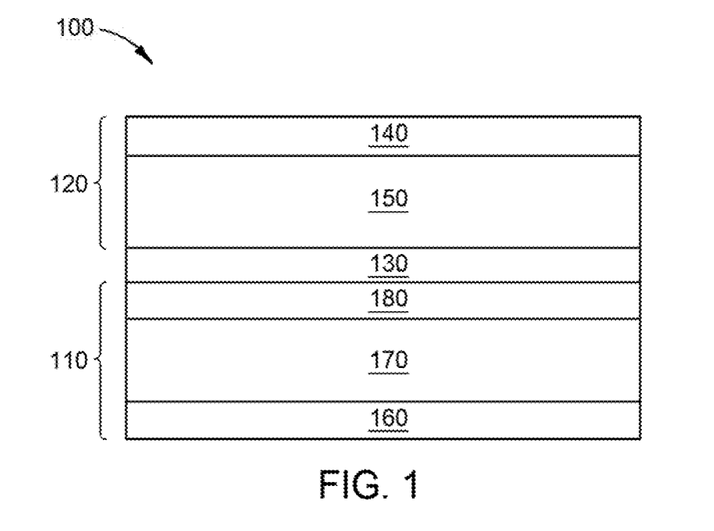
FIG. 1 illustrates a schematic cross-sectional view of one implementation of an energy storage device incorporating an electrode structure formed according to one or more implementations described herein.

FIG. 1 illustrates a schematic cross-sectional view of one implementation of an energy storage device 100 incorporating an anode electrode structure formed according to implementations described herein. The energy storage device 100 may be a solid-state energy storage device or a lithium-ion based energy storage device. The energy storage device 100, even though shown as a planar structure, may also be formed into a cylinder by rolling the stack of layers; furthermore, other cell configurations (e.g., prismatic cells, button cells, or stacked electrode cells) may be formed. The energy storage device 100 includes an anode electrode structure 110 and a cathode electrode structure 120 with a solid-electrolyte film 130 positioned therebetween. In implementations where the energy storage device 100 is a Li-ion energy storage device, the solid-electrolyte film is replaced with a polymer separator and a liquid electrolyte. The cathode electrode structure 120 includes a cathode current collector 140 and a cathode film 150. The anode electrode structure 110 includes an anode current collector 160, an anode film 170, and one or more protective film(s) 180. The one or more protective film(s) 180 include at least one or more of a lithium fluoride (LiF) film; a dielectric or ceramic film (e.g., oxides of titanium (Ti), aluminum (Al), niobium (Nb), tantalum (Ta), zirconium (Zr), or a combination thereof); one or more metal film(s) (e.g., tin (Sn), antimony (Sb), bismuth (Bi), gallium (Ga), germanium (Ge), copper films, silver films, gold films, or a combination thereof); a copper chalcogenide film (e.g., CuS, $Cu_2Se$, $Cu_2S$); a bismuth chalcogenide film (e.g., $Bi_2Te_3$, $Bi_2Se_3$); a tin chalcogenide film (e.g., SnTe, SnSe, $SnSe_2$, SnS), a gallium chalcogenide film (e.g., GaS, $Ga_2S_3$, GaSe, $Ga_2Se_3$, GaTe), a germanium chalcogenide film (GeTe, GeSe, GeS), an indium chalcogenide film (e.g., InS, $In_6S_7$, $In_2S_3$, InSe, $In_{S4}Se_3$, $In_6Se_7$, $In_2Se_3$, InTe, $In_4Te_3$, $In_3Te_4$, $In_7Te_{10}$, $In_2Te_3$, $In_2Te_5$), a silver chalcogenide film ($Ag_2Se$, $Ag_2S$, $Ag_2Te$), boron nitride, lithium nitrate, lithium borohydride, a carbon-containing film, and a combination thereof.

The cathode electrode structure 120 includes the cathode current collector 140 with the cathode film 150 formed on the cathode current collector 140. It should be understood that the cathode electrode structure 120 may include other elements or films.

The current collectors 140, 160, on the cathode film 150 and the anode film 170, respectively, can be identical or different electronic conductors. In some implementations, at least one of the current collectors 140, 160 is a flexible substrate. In some implementations, the flexible substrate is a CPP film (i.e., a casting polypropylene film), an OPP film (i.e., an oriented polypropylene film), or a PET film (i.e., an oriented polyethylene terephthalate film). Alternatively, the flexible substrate may be a pre-coated paper, a polypropylene (PP) film, a PEN film, a poly lactase acetate (PLA) film, or a PVC film. Examples of metals that the current collectors 140, 160 may be comprised of include aluminum (Al), copper (Cu), zinc (Zn), nickel (Ni), cobalt (Co), manganese (Mn), chromium (Cr), stainless steel, clad materials, alloys thereof, and a combination thereof. In one implementation, at least one of the current collectors 140, 160 is perforated. In one implementation, at least one of the current collectors 140, 160 includes a polymer substrate (e.g., polyethylene terephthalate ("PET") coated with a metallic material. In one implementation, the anode current collector 160 is a polymer substrate (e.g., a PET film) coated with copper. In another implementation, the anode current collector 160 is a multi-metal layer on a polymer substrate. The multi-metal layer can be combinations of copper, chromium, nickel, etc. In one implementation, the anode current collector 160 is a multi-layer structure that includes a copper-nickel cladding material. In one implementation, the multi-layer structure includes a first layer of nickel or chromium, a second layer of copper formed on the first layer, and a third layer including nickel, chromium, or both formed on the second layer. In one implementation, the anode current collector 160 is nickel coated copper. Furthermore, current collectors may be of any form factor (e.g., metallic foil, sheet, or plate), shape and micro/macro structure.

Generally, in prismatic cells, tabs are formed of the same material as the current collector and may be formed during fabrication of the stack, or added later. In some implementations, the current collectors extend beyond the stack and the portions of the current collector extending beyond the stack may be used as tabs. In one implementation, the cathode current collector 140 is aluminum. In another implementation, the cathode current collector 140 comprises aluminum deposited on a polymer substrate (e.g., a PET film). In one implementation, the cathode current collector 140 has a thickness below 50 μm more specifically, 5 μm or, even more specifically 2 μm. In one implementation, the cathode current collector 140 has a thickness from about 0.5 μm to about 20 μm (e.g., from about 1 μm to about 10 μm; from about 2 μm to about 8 μm; or from about 5 μm to about 10 μm). In one implementation, the anode current collector 160 is copper. In one implementation, the anode current collector 160 is stainless steel. In one implementation, the anode current collector 160 has a thickness below 50 μm more specifically, 5 μm or, even more specifically 2 μm. In one implementation, the anode current collector 160 has a thickness from about 0.5 μm to about 20 μm (e.g., from about 1 μm to about 10 μm; from about 2 μm to about 8 μm; from about 6 μm to about 12 μm; or from about 5 μm to about 10 μm).

The cathode film 150 or cathode may be any material compatible with the anode and may include an intercalation compound, an insertion compound, or an electrochemically active polymer. Suitable intercalation materials include, for example, lithium-containing metal oxides, $MoS_2$, $FeS_2$, $BiF_3$, $Fe_2OF_4$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable polymers include, for example, polyacetylene, polypyrrole, polyaniline, and polythiophene. The cathode film 150 or cathode may be made from a layered oxide, such as lithium cobalt oxide, an olivine, such as lithium iron phosphate, or a spinel, such as lithium manganese oxide. Exemplary lithium-containing oxides may be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Exemplary phosphates may be iron olivine ($LiFePO_4$) and it's variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

The anode electrode structure 110 includes the anode current collector 160 with the anode film 170 formed on the anode current collector 160. The anode electrode structure 110 comprises the one or more protective film(s) 180, which includes at least one or more of a lithium fluoride (LiF) film; a dielectric or ceramic film (e.g., oxides of titanium (Ti), aluminum (Al), niobium (Nb), tantalum (Ta), zirconium (Zr), or a combination thereof); one or more metal film(s) (e.g., tin (Sn), antimony (Sb), bismuth (Bi), gallium (Ga), germanium (Ge), copper films, silver films, gold films, or a combination thereof); a copper chalcogenide film (e.g., CuS, $Cu_2Se$, $Cu_2S$); a bismuth chalcogenide film (e.g., $Bi_2Te_3$, $Bi_2Se_3$); a tin chalcogenide film (e.g., SnTe, SnSe, $SnSe_2$, SnS), a gallium chalcogenide film (e.g., GaS, $Ga_2S_3$, GaSe, $Ga_2Se_3$, GaTe), a germanium chalcogenide film (GeTe, GeSe, GeS), an indium chalcogenide film (e.g., InS, $In_6S_7$, $In_2S_3$, InSe, $In_{S4}Se_3$, $In_6Se_7$, $In_2Se_3$, InTe, $In_4Te_3$, $In_3Te_4$, $In_7Te_{10}$, $In_2Te_3$, $In_2Te_5$), a silver chalcogenide film ($Ag_2Se$, $Ag_2S$, $Ag_2Te$), boron nitride, lithium nitrate, lithium borohydride, a carbon-containing film, and a combination thereof. In some implementations, the one or more protective film(s) are ion-conducting films.

The anode film 170 may be any material compatible with the cathode film 150. The anode film 170 may have an energy capacity greater than or equal to 372 mAh/g, preferably ≥700 mAh/g, and most preferably ≥1000 mAh/g. The anode film 170 may be constructed from graphite, silicon-containing graphite, lithium metal, lithium metal foil or a lithium alloy foil (e.g. lithium aluminum alloys), or a mixture of a lithium metal and/or lithium alloy and materials such as carbon (e.g. coke, graphite), nickel, copper, tin, indium, silicon, oxides thereof, or a combination thereof.

The anode film 170 typically comprises intercalation compounds containing lithium or insertion compounds containing lithium. In some implementations, the anode film is a lithium metal film. In some implementations, wherein the anode film 170 comprises lithium metal, the lithium metal may be deposited using the methods described herein.

In one implementation, the anode film 170 has a thickness from about 10 μm to about 200 μm (e.g., from about 1 μm to about 100 μm; from about 10 μm to about 30 μm; from about 20 μm to about 30 μm; from about 1 μm to about 20 μm; or from about 50 μm to about 100 μm).

In some implementations, the one or more protective film(s) 180 is formed on the anode film 170. The one or more protective film(s) 180 includes at least one or more of a lithium fluoride (LiF) film; a dielectric or ceramic film (e.g., oxides of titanium (Ti), aluminum (Al), niobium (Nb), tantalum (Ta), zirconium (Zr), or a combination thereof); one or more metal film(s) (e.g., tin (Sn), antimony (Sb), bismuth (Bi), gallium (Ga), germanium (Ge), copper films, silver films, gold films, or a combination thereof); a copper chalcogenide film (e.g., CuS, $Cu_2Se$, $Cu_2S$); a bismuth chalcogenide film (e.g., $Bi_2Te_3$, $Bi_2Se_3$); a tin chalcogenide film (e.g., SnTe, SnSe, $SnSe_2$, SnS), a gallium chalcogenide film (e.g., GaS, $Ga_2S_3$, GaSe, $Ga_2Se_3$, GaTe), a germanium chalcogenide film (GeTe, GeSe, GeS), an indium chalcogenide film (e.g., InS, $In_6S_7$, $In_2S_3$, InSe, $InS_4Se_3$, $In_6Se_7$, $In_2Se_3$, InTe, $In_4Te_3$, $In_3Te_4$, $In_7Te_{10}$, $In_2Te_3$, $In_2Te_5$), a silver chalcogenide film ($Ag_2Se$, $Ag_2S$, $Ag_2Te$), boron nitride, lithium nitrate, lithium borohydride, a carbon-containing film, and a combination thereof. In some implementations, the one or more protective film(s) are ion-conducting films. In some implementations, the one or more protective film(s) 180 are permeable to at least one of lithium ions and lithium atoms. The one or more protective film(s) 180 provide surface protection of the anode film 170, which allows for handling of the anode film in a dry room. In some implementations where the energy storage device 100 is a solid-state energy storage device, the one or more protective film(s) 180 contribute to the formation of an improved SEI layer and thus improve device performance. The one or more protective film(s) 180 can be directly deposited on the anode film 170 by Physical Vapor Deposition (PVD), such as evaporation (e.g., thermal or e-beam) or sputtering, atomic layer deposition (ALD), a slot-die process, dip coating, planar flow melt-spin process, a thin-film transfer process, gravure coating or a three-dimensional lithium printing process.

In some implementations, the one or more protective film(s) 180 include a lithium fluoride (LiF) film.

In some implementations, the one or more protective film(s) 180 include one or more dielectric film(s). In some implementations, the dielectric film is a ceramic film. In some implementations, the dielectric film is an ion-conducting ceramic film. Suitable dielectric film(s) include but are not limited to titanium oxides (e.g., $TiO_2$), aluminum oxides (e.g., $Al_2O_3$, $AlO_x$, $AlO_xN_y$), boron nitride, aluminum oxyhydroxide AlO(OH), niobium oxides (e.g., NbO, $NbO_2$, $Nb_2O_5$), tantalum oxides (e.g., $Ta_2O_5$), zirconium oxides ($ZrO_2$), or a combination thereof. In some implementations, the dielectric film is a binder-free ceramic coating. In some implementations, the dielectric film is a porous aluminum oxide film.

In some implementations, the one or more protective film(s) 180 include one or more metal film(s). Suitable metal film(s) include but are not limited to tin films, antimony films, bismuth films, gallium films, germanium films, copper, silver, gold, or a combination thereof. The one or more metal film(s) may be an ultra-thin metal seed film.

In some implementations, the one or more protective film(s) 180 include one or more metal chalcogenide film(s). Suitable chalcogenide films include but are not limited to copper chalcogenides (e.g., CuS, $Cu_2Se$, $Cu_2S$) and bismuth chalcogenides (e.g., $Bi_2Te_3$, $Bi_2Se_3$), tin chalcogenides (e.g., SnTe, SnSe, $SnSe_2$, SnS), gallium chalcogenides (e.g., GaS, $Ga_2S_3$, GaSe, $Ga_2Se_3$, GaTe), germanium chalcogenides (GeTe, GeSe, GeS), indium chalcogenides (e.g., InS, $In_6S_7$, $In_2S_3$, InSe, $InS_4Se_3$, $In_6Se_7$, $In_2Se_3$, InTe, $In_4Te_3$, $In_3Te_4$, $In_7Te_{10}$, $In_2Te_3$, $In_2Te_5$), silver chalcogenides ($Ag_2Se$, $Ag_2S$, $Ag_2Te$), boron nitride, lithium nitrate, lithium borohydride, and a combination thereof.

In some implementations, the one or more protective film(s) 180 include carbon-containing films. Suitable carbon-containing films include but are not limited to amorphous carbon films (e.g., diamond-like carbon (DLC)), CVD diamond films, graphite films, and graphene oxides.

In some implementations, each layer of the one or more protective film(s) 180 is a coating or a discrete film having a thickness in a range of 1 nanometer to 3,000 nanometers (e.g., in the range of 10 nanometers to 600 nanometers; in the range of 50 nanometers to 100 nanometers; in the range of 50 nanometers to 200 nanometers; in the range of 100 nanometers to 150 nanometers). In some implementations, each layer of the one or more protective film(s) 180 is a coating or discrete film having a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In some implementations, each layer of the one or more protective film(s) 180 is a coating or discrete film having a thickness of 100 nanometers or less (e.g., from about 5 nanometers to about 100 nanometers; from about 5 nanometers to about 40 nanometers; from about 10 nanometers to about 20 nanometers; or from about 50 nanometers to about 100 nanometers).

In some implementations, at least one of the one or more protective film(s) 180 is porous. In some implementations, at least one of the one or more protective film(s) 180 has nanopores. In some implementations, at least one of the one or more protective film(s) 180 has a plurality of nanopores that are sized to have an average pore size or diameter less than about 10 nanometers (e.g., from about 1 nanometer to about 10 nanometers; from about 3 nanometers to about 5 nanometers). In another implementation, at least one of the one or more protective film(s) 180 has a plurality of nanopores sized to have an average pore size or diameter less than about 5 nanometers. In one implementation, at least one of the one or more protective film(s) 180 has a plurality of nanopores having a diameter ranging from about 1 nanometer to about 20 nanometers (e.g., from about 2 nanometers to about 15 nanometers; or from about 5 nanometers to about 10 nanometers).

In some implementations, the solid-electrolyte film 130 is a lithium-ion conducting material. In some implementations, the lithium-ion conducting material is a lithium-ion conducting ceramic or a lithium-ion conducting glass. The Li-ion conducting material may be comprised of one or more of LiPON, doped variants of either crystalline or amorphous phases of $Li_7La_3Zr_2O_{12}$, doped anti-perovskite compositions, argyrodite compositions (e.g., $Li_6PS_5Br$, $Li_6PS_5Cl$, $Li_7PS_6$, $Li_3SBF_4$, $A_{3-2\times 0.005}Ba_{0.005}OCl$ (A=alkali metal), $Li_{9.54}Si_{1.74}P_{1.44}S_{11.7}Cl_{0.3}$, $Li_6PS_5I$, $Li_6PO_5Cl$), lithium-sulfur-phosphorous materials, $(Li_{0.7}Na_{0.3})_3BH_4B_{12}H_{12}$, $Li_2S-P_2S_5$, $Li_{10}GeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, amorphous $xLiI-(1-x)Li_4SnS_4$), $Li_3S(BF_4)_{0.5}Cl_{0.5}$, $Li_4Ti_5O_{12}$, lithium doped lanthanum titanate (LATP), $Li_{2+2x}Zn_{1-x}GeO_4$, $LiM_2(PO_4)_3$ where M=Ti, Ge, Hf, for example. In one implementation, x is between 0 and 1 (e.g., 0.1, 0.2, 0.3, 0.4, 0.5, 0.6, 0.7, 0.8, and 0.9).

Figure 2:
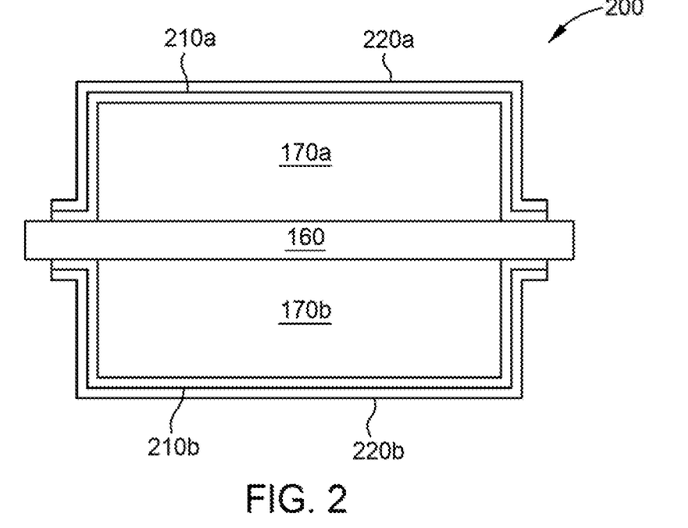
FIG. 2 illustrates a cross-sectional view of one implementation of a dual-sided anode electrode structure formed according to one or more implementations described herein.

FIG. 2 illustrates a cross-sectional view of one implementation of an anode electrode structure 200 formed according to implementations described herein. Note in FIG. 2 that the anode current collector 160 is shown to extend beyond the stack, although it is not necessary for the anode current collector 160 to extend beyond the stack, the portions extending beyond the stack may be used as tabs. Although the anode electrode structure 200 is depicted as a dual-sided electrode structure, it should be understood that the implementations described herein also apply to single-sided electrode structures.

The anode electrode structure 200 has the anode current collector 160 and anode films 170a, 170b (collectively 170) formed on opposing sides of the anode current collector 160. In one implementation, the anode film 170 is a lithium metal film. In one implementation, the anode film 170 has a thickness of 20 micrometers or less (e.g., from about 1 micrometer to about 20 micrometers). A first protective film 210a, 210b (collectively 210) is formed on each of the anode films 170a, 170b. In one implementation, the first protective film 210 is selected from the group comprising a metal chalcogenide film, a dielectric film, a metallic film, a lithium fluoride film, or a combination thereof. In some implementations, the first protective film 210 has a thickness in a range of 1 nanometer to 3,000 nanometers (e.g., in the range of 10 nanometers to 600 nanometers; in the range of 50 nanometers to 100 nanometers; in the range of 50 nanometers to 200 nanometers; in the range of 100 nanometers to 150 nanometers). In some implementations, the first protective film 210 has a thickness of 100 nanometers or less (e.g., from about 5 nanometers to 100 nanometers; from about 5 nanometers to about 40 nanometers; from about 10 nanometers to about 20 nanometers; or from about 50 nanometers to about 100 nanometers). In some implementations, as depicted in FIG. 2, the first protective film 210 coats the exposed surfaces (e.g., top surface and sidewalls) of the anode film 170 extending to contact the anode current collector 160.

A second protective film 220a, 220b (collectively 220) is formed on each of the first protective film(s) 210. In some implementations, the second protective film 220 is permeable to at least one of lithium ions and lithium atoms. In one implementation, the second protective film 220 is selected from the group comprising lithium fluoride films, metallic films, carbon-containing films, or a combination thereof. In some implementations, the second protective film 220 has a thickness in a range of 1 nanometer to 3,000 nanometers (e.g., in the range of 10 nanometers to 600 nanometers; in the range of 50 nanometers to 100 nanometers; in the range of 50 nanometers to 200 nanometers; in the range of 100 nanometers to 150 nanometers). In some implementations, the second protective film 220 has a thickness of 100 nanometers or less (e.g., from about 5 nanometers to 100 nanometers; from about 5 nanometers to about 40 nanometers; from about 10 nanometers to about 20 nanometers; or from about 50 nanometers to about 100 nanometers).

In some implementations, the first protective film 210 is a metal chalcogenide film and the second protective film 220 is a lithium fluoride film. In some implementations, the first protective film 210 is a dielectric film and the second protective film 220 is a lithium fluoride film. In some implementations, the first protective film 210 is a metal chalcogenide film and the second protective film 220 is a metallic film. In some implementations, the first protective film 210 is a metallic film and the second protective film 220 is a lithium fluoride film. In some implementations, the first protective film 210 is a LiF film and the second protective film 220 is carbon or graphene oxide.

Figure 3:
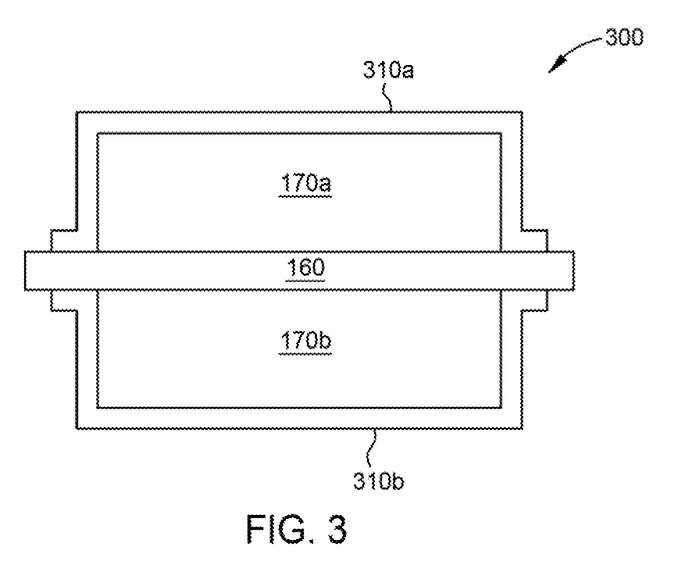
FIG. 3 illustrates a cross-sectional view of one implementation of a dual-sided anode electrode structure formed according to one or more implementations described herein.

FIG. 3 illustrates a cross-sectional view of one implementation of an anode electrode structure 300 formed according to implementations described herein. Note in FIG. 3 that the anode current collector 160 is shown to extend beyond the stack, although it is not necessary for the anode current collector 160 to extend beyond the stack, the portions extending beyond the stack may be used as tabs. Although the anode electrode structure 300 is depicted as a dual-sided electrode structure, it should be understood that the implementations described herein also apply to single-sided electrode structures.

The anode electrode structure 300 has the anode current collector 160 and anode films 170a, 170b (collectively 170) formed on opposing sides of the anode current collector 160. In one implementation, the anode film 170 is a lithium metal film. In one implementation, the anode film 170 has a thickness of 20 micrometers or less (e.g., from about 1 micrometer to about 20 micrometers). A carbon-containing protective film 310a, 310b (collectively 310) is formed on each of the anode films 170a, 170b. In one implementation, the carbon-containing protective film 310 is selected from the group comprising amorphous carbon films (e.g., diamond-like carbon (DLC)), CVD diamond films, graphite films, and graphene oxides. In some implementations, the carbon protective film 310 has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In some implementation, the carbon protective film 310 has a thickness of 100 nanometers or less (e.g., from about 5 nanometers to 100 nanometers; from about 5 nanometers to about 40 nanometers; from about 10 nanometers to about 20 nanometers; or from about 50 nanometers to about 100 nanometers). In some implementations, as depicted in FIG. 3, the carbon-containing protective film 310 coats the exposed surfaces (e.g., top surface and sidewalls) of the anode film 170 extending to contact the anode current collector 160.

Figure 4:
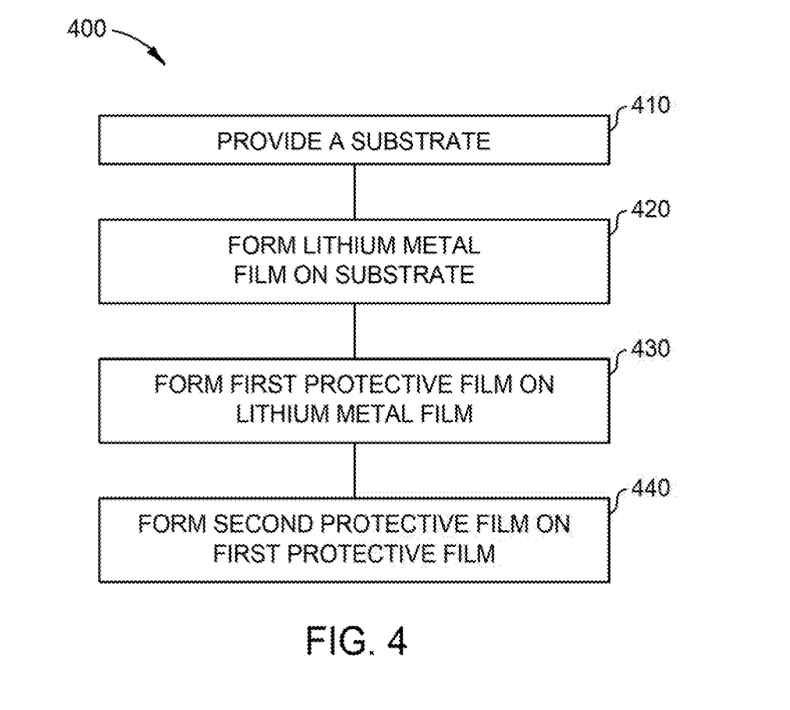
FIG. 4 illustrates a process flow chart summarizing one implementation of a method for forming an anode electrode structure according to one or more implementations described herein.
Figure 6:
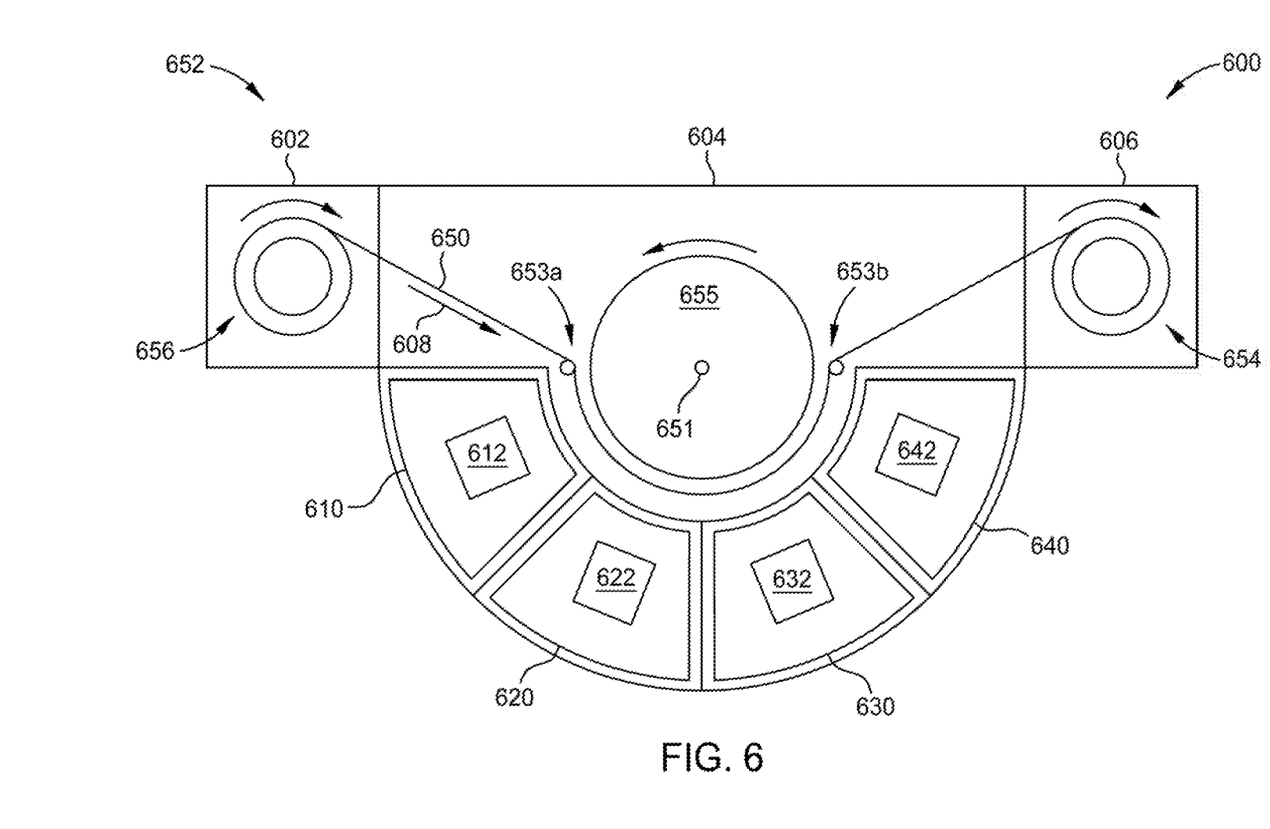
FIG. 6 illustrates a schematic view of an integrated processing tool for forming anode electrode structures according to one or more implementations described herein.

FIG. 4 illustrates a process flow chart summarizing one implementation of a method 400 for forming an anode electrode structure according to implementations described herein. The anode electrode structure may be the anode electrode structure 200 depicted in FIG. 2. At operation 410, a substrate is provided. In one implementation, the substrate is a continuous sheet of material 650 as shown in FIG. 6. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and a combination thereof. In one implementation, the substrate is copper material. In one implementation, the substrate is a stainless steel material. In one implementation, the substrate is perforated. Furthermore, the substrate may be of any form factor (e.g., metallic foil, sheet, or plate), shape and micro/macrostructure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 420, a lithium metal film is formed on the substrate. In one implementation, the lithium metal film is the anode film 170 and the substrate is the anode current collector 160. In one implementation, the lithium metal film is formed on a copper current collector. In some implementations, if an anode film is already present on the substrate, the lithium metal film is formed on the anode film. If the anode film 170 is not present, the lithium metal film may be formed directly on the substrate. Any suitable lithium metal film deposition process for depositing thin films of lithium metal may be used to deposit the thin film of lithium metal. Deposition of the thin film of lithium metal may be by PVD processes, such as evaporation (e.g., thermal evaporation or e-beam), a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system.

At operation 430, a first protective film is formed on the lithium metal film. With reference to FIG. 2, the first protective film may be the first protective film 210 and the lithium metal film may be anode film 170. In one implementation, the first protective film 210 is selected from the group comprising a metal chalcogenide film, a dielectric film, a metallic film, a lithium fluoride film, or a combination thereof. In some implementations, the first protective film 210 has a thickness in a range of 1 nanometer to 3,000 nanometers (e.g., in the range of 10 nanometers to 600 nanometers; in the range of 50 nanometers to 100 nanometers; in the range of 50 nanometers to 200 nanometers; in the range of 100 nanometers to 150 nanometers). In some implementations, the first protective film 210 has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In some implementations, the first protective film 210 has a thickness of 100 nanometers or less (e.g., from about 5 nanometers to 100 nanometers; from about 10 nanometers to about 20 nanometers; or from about 50 nanometers to about 100 nanometers).

In some implementations, the first protective film 210 is a metal chalcogenide film. In some implementations, the metal chalcogenide film is deposited using a PVD process having an RF power source coupled to a target. The target is typically composed of the materials of the metal chalcogenide film. For example, in one implementation, the target is a bismuth-telluride alloy target. In one implementation, the bismuth-telluride alloy target comprises from about 5 at. % to about 95 at. % bismuth and from about 5 at. % to about 95 at. % tellurium. The plasma may be generated from a non-reactive gas such as argon (Ar), krypton (Kr), nitrogen, etc. For example, a plasma may be generated from argon gas having a flow rate within a range from about 30 standard cubic centimeters (sccm) to about 200 sccm, such as about 100 sccm to about 150 sccm. An RF power may be applied to the target at a power level within a range from about 50 W to about 4,000 W, for example, about 1000 W to about 3000 W, such as about 2000 W. The deposition chamber may be pressurized from about 0.1 mTorr to about 500 mTorr. The deposition chamber may be pressurized from about 0.1 mTorr to about 100 mTorr, for example, from about 10 mTorr to about 30 mTorr, such as 25 mTorr. The substrate may be electrically "floating" and have no bias. In one implementation, the deposition process of operation 430 may be performed at a deposition temperature from about 50° C. to about 400° C., for example, from about 100° C. to about 200° C., such as about 120° C.

In another implementation, the plasma may be generated using a DC power source coupled to a bismuth-telluride alloy target. The substrate may be electrically "floating" and have no bias. In this implementation, plasma may be generated from an argon gas having a flow rate within a range from about 30 standard cubic centimeters (sccm) to about 200 sccm, such as about 100 sccm to about 150 sccm. A DC power may be applied to the target at a power level within a range from about 50 W to about 5,000 W, from about 1000 W to about 3000 W, for example between about 1000 W to about 2000 W, such as about 2000 W. The deposition chamber may be pressurized from about 0.1 mTorr to about 500 mTorr. The deposition chamber may be pressurized from about 0.1 mTorr to about 500 mTorr. The deposition chamber may be pressurized from about 0.1 mTorr to about 100 mTorr, for example, from about 10 mTorr to about 30 mTorr, such as 25 mTorr. The substrate may be electrically "floating" and have no bias. The deposition process of operation 430 may be performed at a deposition temperature from about 50° C. to about 400° C., for example, from about 100° C. to about 200° C., such as about 120° C.

In some implementations, the first protective film 210 is a dielectric. Suitable methods for depositing the dielectric film include, but are not limited to, PVD, such as evaporation or sputtering, a slot-die process, a thin-film transfer process, a chemical vapor deposition (CVD) process, or a three-dimensional lithium printing process.

In some implementations, the first protective film 210 is a metal film. In some implementations, the metal film is a copper film, a bismuth film, a tin film, a gallium film, or a germanium film. In some implementations, the metal film is an ultra-thin metal film. Any suitable metal film deposition process for depositing thin films of metal may be used to deposit the thin film of metal. Deposition of the thin film of metal may be by a PVD process, such as evaporation (e.g., thermal or e-beam), a CVD process, a slot-die process, a transfer process, or a three-dimensional lithium printing process. The chamber for depositing the thin film of metal may include a PVD system, such as an electron-beam evaporator, a thermal evaporator, or a sputtering system, a thin film transfer system (including large area pattern printing systems such as gravure printing systems) or a slot-die deposition system.

At operation 440, a second protective film is formed on the first protective film. With reference to FIG. 2, the second protective film may be the second protective film 220 and the first protective film may be the first protective film 210. In one implementation, the second protective film 220 is selected from the group comprising a lithium fluoride film, a metal film, a carbon-containing film, or a combination thereof. In some implementations, the second protective film 220 has a thickness in a range of 1 nanometer to 3,000 nanometers (e.g., in the range of 10 nanometers to 600 nanometers; in the range of 50 nanometers to 100 nanometers; in the range of 50 nanometers to 200 nanometers; in the range of 100 nanometers to 150 nanometers). In some implementations, the second protective film 220 has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In some implementations, the second protective film 220 has a thickness of 100 nanometers or less (e.g., from about 5 nanometers to 100 nanometers; from about 10 nanometers to about 20 nanometers; or from about 50 nanometers to about 100 nanometers).

In some implementations, the second protective film 220 is a lithium fluoride film. Suitable methods for depositing the lithium fluoride film include, but are not limited to, PVD, such as evaporation or sputtering, a slot-die process, a thin-film transfer process, a chemical vapor deposition (CVD) process, or a three-dimensional lithium printing process. In some implementations, PVD is the method for deposition of the lithium fluoride film. In some implementations, the lithium fluoride film is deposited using a thermal evaporation process. In some implementations, the lithium fluoride film is deposited using an e-beam evaporation process.

In some implementations, the second protective film 220 is a metal film. In some implementations, the metal film is a copper film, a bismuth film, a tin film, a gallium film, or a germanium film. In some implementations, the metal film is an ultra-thin metal film. Any suitable metal film deposition process for depositing thin films of metal may be used to deposit the thin film of metal. Deposition of the thin film of metal may be by a PVD process, such as evaporation (e.g., thermal or e-beam), a CVD process, a slot-die process, a transfer process, or a three-dimensional lithium printing process. The chamber for depositing the thin film of metal may include a PVD system, such as an electron-beam evaporator, a thermal evaporator, or a sputtering system, a thin film transfer system (including large area pattern printing systems such as gravure printing systems) or a slot-die deposition system.

Figure 5:
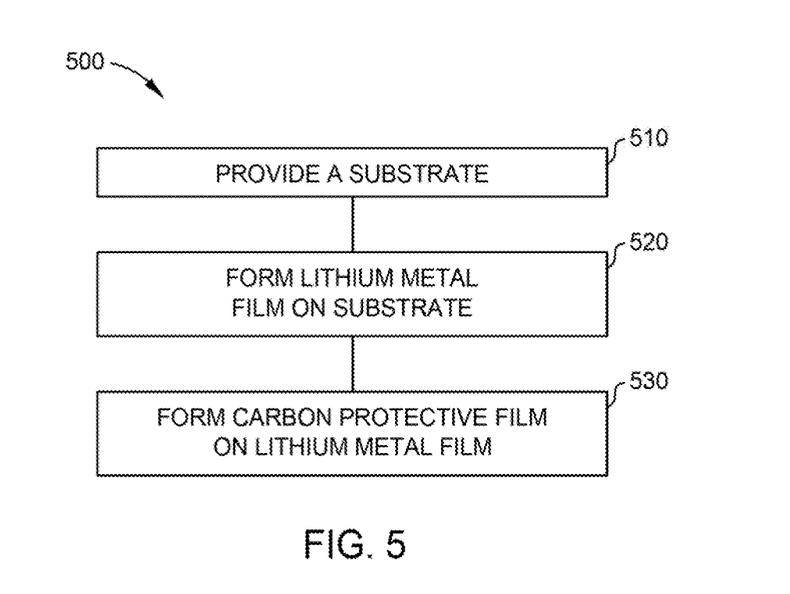
FIG. 5 illustrates a process flow chart summarizing one implementation of a method for forming an anode electrode structure according to one or more implementations described herein.

FIG. 5 illustrates a process flow chart summarizing one implementation of a method 500 for forming an anode electrode structure according to one or more implementations described herein. The anode electrode structure may be the anode electrode structure 300 depicted in FIG. 3. At operation 510, a substrate is provided. In one implementation, the substrate is a continuous sheet of material 650 as shown in FIG. 6. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and a combination thereof. In one implementation, the substrate is copper material. In one implementation, the substrate is stainless steel. In one implementation, the substrate is perforated. Furthermore, the substrate may be of any form factor (e.g., metallic foil, sheet, or plate), shape and micro/macrostructure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 520, a lithium metal film is formed on the substrate. In one implementation, the lithium metal film is the anode film 170 and the substrate is the anode current collector 160. In one implementation, the lithium metal film is formed on a copper current collector. In some implementations, if an anode film is already present on the substrate, the lithium metal film is formed on the anode film. If the anode film 170 is not present, the lithium metal film may be formed directly on the substrate. Any suitable lithium metal film deposition process for depositing thin films of lithium metal may be used to deposit the thin film of lithium metal. Deposition of the thin film of lithium metal may be by PVD processes, such as evaporation, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system.

At operation 530, a carbon-containing protective film is formed on the lithium metal film. With reference to FIG. 3, the carbon-containing protective film may be the carbon-containing protective film 310 and the lithium metal film may be the anode film 170. In one implementation, the carbon-containing protective film 310 is selected from the group comprising amorphous carbon films (e.g., diamond-like carbon (DLC)), CVD diamond films, graphite films, and graphene oxides. In some implementations, the carbon-containing protective film 310 has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In one implementation, the carbon-containing protective film 310 has a thickness of 100 nanometers or less (e.g., from about 5 nanometers to 100 nanometers; from about 10 nanometers to about 20 nanometers; or from about 50 nanometers to about 100 nanometers).

Any suitable carbon-containing film deposition process may be used to deposit the carbon-containing protective film. Deposition of the carbon-containing film may be by PVD processes, such as evaporation (e.g., thermal or e-beam), a CVD process, a slot-die process, a transfer process, or a three-dimensional lithium printing process. The chamber for depositing the carbon-containing film may include a PVD system, such as an electron-beam evaporator, a thermal evaporator, or a sputtering system, a thin film transfer system (including large area pattern printing systems such as gravure printing systems) or a slot-die deposition system.

FIG. 6 illustrates a schematic view of a flexible substrate coating apparatus 600 for forming anode electrode structures according to implementations described herein. The flexible substrate coating apparatus 600 may be a SMARTWEB®, manufactured by Applied Materials, adapted for manufacturing lithium anode devices according to the implementations described herein. According to typical implementations, the flexible substrate coating apparatus 600 can be used for manufacturing lithium anodes, and particularly for SEI film stacks for lithium anodes. The flexible substrate coating apparatus 600 is constituted as a roll-to-roll system including an unwinding module 602, a processing module 604 and a winding module 606. In some implementations, the processing module 604 comprises a plurality of processing modules or chambers 610, 620, 630 and 640 arranged in sequence, each configured to perform one processing operation to the continuous sheet of material 650 or web of material. In one implementation, as depicted in FIG. 6, the processing chambers 610-640 are radially disposed about a coating drum 655. Arrangements other than radial are contemplated. For example, in another implementation, the processing chambers may be positioned in a linear configuration.

In one implementation, the processing chambers 610-640 are stand-alone modular processing chambers wherein each modular processing chamber is structurally separated from the other modular processing chambers. Therefore, each of the stand-alone modular processing chambers, can be arranged, rearranged, replaced, or maintained independently without affecting each other. Although four processing chambers 610-640 are shown, it should be understood that any number of processing chambers may be included in the flexible substrate coating apparatus 600.

The processing chambers 610-640 may include any suitable structure, configuration, arrangement, and/or components that enable the flexible substrate coating apparatus 600 to deposit a lithium anode device according to implementations of the present disclosure. For example, but not limited to, the processing chambers may include suitable deposition systems including coating sources, power sources, individual pressure controls, deposition control systems, and temperature control. According to typical implementations, the chambers are provided with individual gas supplies. The chambers are typically separated from each other for providing a good gas separation. The flexible substrate coating apparatus 600 according to implementations described herein is not limited in the number of deposition chambers. For example, but not limited to, flexible substrate coating apparatus 600 may include 3, 6, or 12 processing chambers.

The processing chambers 610-640 typically include one or more deposition units 612, 622, 632, and 642. Generally, the one or more deposition units as described herein can be selected from a CVD source, a PECVD source and a PVD source. The one or more deposition units can include an evaporation source (thermal evaporation or e-beam), a sputter source, such as, a magnetron sputter source, DC sputter source, AC sputter source, pulsed sputter source, radio frequency (RF) sputtering, or middle frequency (MF) sputtering can be provided. For instance, MF sputtering with frequencies in the range of 5 kHz to 100 kHz, for example, 30 kHz to 50 kHz, can be provided. The one or more deposition units can include an evaporation source. In one implementation, the evaporation source is a thermal evaporation source or an electron beam evaporation. In one implementation, the evaporation source is a lithium (Li) source. Further, the evaporation source may also be an alloy of two or more metals. The material to be deposited (e.g., lithium) can be provided in a crucible. The lithium can, for example, be evaporated by thermal evaporation techniques or by electron beam evaporation techniques.

In some implementations, any of the processing chambers 610-640 of the flexible substrate coating apparatus 600 may be configured for performing deposition by sputtering, such as magnetron sputtering. As used herein, "magnetron sputtering" refers to sputtering performed using a magnet assembly, that is, a unit capable of a generating a magnetic field. Typically, such a magnet assembly includes a permanent magnet. This permanent magnet is typically arranged within a rotatable target or coupled to a planar target in a manner such that the free electrons are trapped within the generated magnetic field generated below the rotatable target surface. Such a magnet assembly may also be arranged coupled to a planar cathode.

Magnetron sputtering may also be realized by a double magnetron cathode, such as, but not limited to, a Twin-Mag™ cathode assembly. In some implementations, the cathodes in the processing chamber may be interchangeable. Thus, a modular design of the apparatus is provided which facilitates optimizing the apparatus for particular manufacturing processes. In some implementations, the number of cathodes in a chamber for sputtering deposition is chosen for optimizing an optimal productivity of the flexible substrate coating apparatus 600.

In some implementations, one or some of the processing chambers 610-640 may be configured for performing sputtering without a magnetron assembly. In some implementations, one or some of the chambers may be configured for performing deposition by other methods, such as, but not limited to, chemical vapor deposition, atomic laser deposition or pulsed laser deposition. In some implementations, one or some of the chambers may be configured for performing a plasma treatment process, such as a plasma oxidation or plasma nitridation process.

In some implementations, the processing chambers 610-640 are configured to process both sides of the continuous sheet of material 650. Although the flexible substrate coating apparatus 600 is configured to process the continuous sheet of material 650, which is horizontally oriented, the flexible substrate coating apparatus 600 may be configured to process substrates positioned in different orientations, for example, the continuous sheet of material 650 may be vertically oriented. In some implementations, the continuous sheet of material 650 is a flexible conductive substrate. In some implementations, the continuous sheet of material 650 includes a conductive substrate with one or more layers formed thereon. In some implementations, the conductive substrate is a copper substrate.

In some implementations, the flexible substrate coating apparatus 600 comprises a transfer mechanism 652. The transfer mechanism 652 may comprise any transfer mechanism capable of moving the continuous sheet of material 650 through the processing region of the processing chambers 610-640. The transfer mechanism 652 may comprise a common transport architecture. The common transport architecture may comprise a reel-to-reel system with a common take-up reel 654 positioned in the winding module 606, the coating drum 655 positioned in the processing module 604, and a feed reel 656 positioned in the unwinding module 602. The take-up reel 654, the coating drum 655, and the feed reel 656 may be individually heated. The take-up reel 654, the coating drum 655 and the feed reel 656 may be individually heated using an internal heat source positioned within each reel or an external heat source. The common transport architecture may further comprise one or more auxiliary transfer reels 653a, 653b (collectively 653) positioned between the take-up reel 654, the coating drum 655, and the feed reel 656. Although the flexible substrate coating apparatus 600 is depicted as having a single processing region, in some implementations, it may be advantageous to have separated or discrete processing regions for each individual processing chamber 610-640. For implementations having discrete processing regions, modules, or chambers, the common transport architecture may be a reel-to-reel system where each chamber or processing region has an individual take-up-reel and feed reel and one or more optional intermediate transfer reels positioned between the take-up reel and the feed reel.

The flexible substrate coating apparatus 600 may comprise the feed reel 656 and the take-up reel 654 for moving the continuous sheet of material 650 through the different processing chambers 610-640. In one implementation, the first processing chamber 610 and the second processing chamber 620 are each configured to deposit a portion of a lithium metal film. The third processing chamber 630 is configured to deposit a chalcogenide film. The fourth processing chamber 640 is configured to deposit a lithium fluoride film over the chalcogenide film. In another implementation, the first processing chamber 610 and the second processing chamber 620 are each configured to deposit a portion of a lithium metal film. The third processing chamber 630 is configured to deposit a dielectric film. The fourth processing chamber 640 is configured to deposit a lithium fluoride film over the dielectric film. In yet another implementation, the first processing chamber 610 and the second processing chamber 620 are each configured to deposit a portion of a lithium metal film. The third processing chamber 630 is configured to deposit a chalcogenide film. The fourth processing chamber 640 is configured to deposit a metallic film over the chalcogenide film. In yet another implementation, the first processing chamber 610 and the second processing chamber 620 are each configured to deposit a portion of a lithium metal film. The third processing chamber 630 is configured to deposit a metallic film over the lithium metallic film. The fourth processing chamber 640 is configured to deposit a lithium fluoride film over the metallic film.

In one implementation, processing chambers 610-620 are configured for depositing a thin film of lithium metal on the continuous sheet of material 650. Any suitable lithium deposition process for depositing thin films of lithium metal may be used to deposit the thin film of lithium metal. Deposition of the thin film of lithium metal may be by PVD processes, such as evaporation (e.g., thermal evaporation or e-beam), a slot-die process, a transfer process, a lamination process or a three-dimensional lithium printing process. The chambers for depositing the thin film of lithium metal may include a PVD system, such as a thermal evaporator, an electron-beam evaporator, a thin film transfer system (including large area pattern printing systems such as gravure printing systems), a lamination system, or a slot-die deposition system.

In one implementation, the third processing chamber 630 is configured for depositing a chalcogenide film on the lithium metal film. The chalcogenide film may be deposited using a PVD sputtering technique as described herein. In one implementation, the fourth processing chamber 640 is configured for forming a lithium fluoride film on the chalcogenide film. Any suitable lithium deposition process for depositing thin films of lithium metal may be used to deposit the thin film of lithium metal. Deposition of the thin film of lithium metal may be by PVD processes, such as evaporation, a slot-die process, a transfer process, a lamination process or a three-dimensional lithium printing process. In one implementation, the fourth processing chamber 640 is an evaporation chamber or PVD chamber configured to deposit a lithium fluoride film over the continuous sheet of material 650. In one implementation, the evaporation chamber has a processing region that is shown to comprise an evaporation source that may be placed in a crucible, which may be a thermal evaporator or an electron beam evaporator (cold) in a vacuum environment, for example.

In operation, the continuous sheet of material 650 is unwound from the feed reel 656 as indicated by the substrate movement direction shown by arrow 608. The continuous sheet of material 650 may be guided via one or more auxiliary transfer reels 653a, 653b. It is also possible that the continuous sheet of material 650 is guided by one or more substrate guide control units (not shown) that shall control the proper run of the flexible substrate, for instance, by fine adjusting the orientation of the flexible substrate.

After uncoiling from the feed reel 656 and running over the auxiliary transfer reel 653a, the continuous sheet of material 650 is then moved through the deposition areas provided at the coating drum 655 and corresponding to positions of the deposition units 612, 622, 632, and 642. During operation, the coating drum 655 rotates around axis 651 such that the flexible substrate moves in the direction of arrow 608.

Implementations:

Clause 1. A method, comprising forming a lithium metal film on a current collector, wherein the current collector comprises copper and/or stainless steel; and forming a protective film stack on the lithium metal film, comprising forming a first protective film on the lithium metal film, wherein the first protective film is selected from a bismuth chalcogenide film, a copper chalcogenide film, a tin chalcogenide film, a gallium chalcogenide film, a germanium chalcogenide film, an indium chalcogenide film, a silver chalcogenide film, a dielectric film, a lithium fluoride film, or a combination thereof.

Clause 2. The method of clause 1, wherein forming the protective film stack further comprises forming a second protective film on the first protective film, the second protective film selected from a lithium fluoride (LiF) film, a metallic film, a carbon-containing film, or a combination thereof.

Clause 3. The method of clause 1 or 2, wherein the dielectric film is selected from oxides of: titanium (Ti), aluminum (Al), niobium (Nb), tantalum (Ta), zirconium (Zr), or a combination thereof.

Clause 4. The method of any clauses 1 to 3, wherein the bismuth chalcogenide film and the copper chalcogenide film are selected from CuS, $Cu_2Se$, $Cu_2S$, $Cu_2Te$, CuTe, $Bi_2Te_3$, $Bi_2Se_3$, or a combination thereof.

Clause 5. The method of any of clauses 2 to 4, wherein the metallic film is selected from tin (Sn), antimony (Sb), bismuth (Bi), gallium (Ga), germanium (Ge), copper (Cu), silver (Ag), gold (Au), or a combination thereof.

Clause 6. The method of any of clauses 1 to 5, wherein the first protective film is the bismuth chalcogenide film or the copper chalcogenide film and the second protective film is lithium fluoride.

Clause 7. The method of any of clauses 1 to 6, wherein the first protective film is the bismuth chalcogenide film or the copper chalcogenide film and the second protective film is the metallic film.

Clause 8. The method of any of clauses 2 to 7, wherein the first protective film is the lithium fluoride film and the second protective film is the carbon-containing film.

Clause 9. The method of any of clauses 1 to 8, wherein the first protective film has a thickness of 100 nanometers or less.

Clause 10. The method of any of clauses 1 to 9, further comprising exposing the current collector to a plasma treatment or corona discharge process to remove organic materials from exposed surfaces of the current collector prior to forming the lithium metal film on the current collector.

Clause 11. The method of any of clauses 1 to 10, wherein forming the first protective film comprises performing at least one of a sputtering process, a thermal evaporation process, an e-beam evaporation process, and a chemical vapor deposition (CVD) process.

Clause 12. The method of claim any of clauses 2 to 11, wherein forming the second protective film comprises performing at least one of a sputtering process, a thermal evaporation process, an e-beam evaporation process, and a chemical vapor deposition (CVD) process.

Clause 13. The method of any of clauses 2 to 12, wherein the second protective film has a thickness of 100 nanometers or less.

Clause 14. An anode electrode structure, comprising a current collector comprising copper and/or stainless steel; a lithium metal film formed on the current collector; and a protective film stack formed on the lithium metal film, comprising a first protective film formed on the lithium metal film, wherein the first protective film is selected from a bismuth chalcogenide film, a copper chalcogenide film, a tin chalcogenide film, a gallium chalcogenide film, a germanium chalcogenide film, an indium chalcogenide film, a silver chalcogenide film, a dielectric film, a lithium fluoride film, or a combination thereof; and a second protective film formed on the first protective film, the second protective film selected from a lithium fluoride (LiF) film, a metallic film, a carbon-containing film, or a combination thereof.

Clause 15. The anode electrode structure of clause 14, wherein the dielectric film is selected from oxides of: titanium (Ti), aluminum (Al), niobium (Nb), tantalum (Ta), zirconium (Zr), or a combination thereof.

Clause 16. The anode electrode structure of clause 14 or 15, wherein the bismuth chalcogenide film and the copper chalcogenide film are selected from CuS, $Cu_2Se$, $Cu_2S$, $Cu_2Te$, CuTe, $Bi_2Te_3$, $Bi_2Se_3$, or a combination thereof.

Clause 17. The anode electrode structure of any of clauses 14 to 16, wherein the metallic film is selected from tin (Sn), antimony (Sb), bismuth (Bi), gallium (Ga), germanium (Ge), copper (Cu), silver (Ag), gold (Au), or a combination thereof.

Clause 18. The anode electrode structure of any of clauses 14 to 17, wherein the first protective film is the bismuth chalcogenide film or the copper chalcogenide film and the second protective film is lithium fluoride.

Clause 19. The anode electrode structure of any of clauses 14 to 18, wherein the first protective film is the bismuth chalcogenide film or the copper chalcogenide film and the second protective film is the metallic film.

Clause 20. The anode electrode structure of any of clauses 14 to 19, wherein the first protective film is the lithium fluoride film and the second protective film is the carbon-containing film.

Clause 21. The anode electrode structure of any of clauses 14 to 20, wherein the first protective film has a thickness of 100 nanometers or less.

Clause 22. The anode electrode structure of any of clauses 14 to 21, wherein the second protective film has a thickness of 100 nanometers or less.

Clause 23. An energy storage device, comprising the anode electrode structure of any of clauses 14 to 22; a cathode electrode structure; and a solid electrolyte film formed between the anode electrode structure and the cathode electrode structure.

Clause 24. The energy storage device of clause 23, wherein the solid electrolyte film is comprised of one or more of: LiPON, doped variants of either crystalline or amorphous phases of $Li_7La_3Zr_2O_{12}$, doped anti-perovskite compositions, argyrodite compositions, lithium-sulfur-phosphorous materials, $Li_2S$—$P_2S_5$, $Li_{10}GeP_2S_{12}$, and $Li_3PS_4$, lithium phosphate glasses, $(1-x)LiI$-$(x)Li_4SnS_4$, $xLiI$-$(1-x)Li_4SnS_4$, mixed sulfide and oxide electrolytes (crystalline LLZO, amorphous $(1-x)LiI$-$(x)Li_4SnS_4$ mixture, amorphous $xLiI$-$(1-x)Li_4SnS_4$), $Li_3S(BF_4)_{0.5}Cl_{0.5}$, $Li_4Ti_5O_{12}$, lithium doped lanthanum titanate (LATP), $Li_{2+2x}Zn_{1-x}GeO_4$, $LiTi_2(PO_4)_3$, $LiHf_2(PO_4)_3$, $LiGe_2(PO_4)_3$, and a combination thereof.

In summary, some of the benefits of the present disclosure include the efficient integration of lithium metal deposition into currently available processing systems. Currently, lithium metal deposition is performed in a dry room or an argon gas atmosphere. Due to the volatility of lithium metal, subsequent processing operations are performed in an argon gas atmosphere. Performance of subsequent processing operations in an argon gas atmosphere would involve retrofitting of current manufacturing tools. It has been found by the inventors that coating the lithium metal with a protective film prior to subsequent processing, allows subsequent processing to be performed either under vacuum or in atmosphere. The protective film eliminates the need to perform additional processing operations in an inert gas atmosphere reducing the complexity of tools. The protective film also allows for the transportation, storage, or both of the negative electrode with the lithium metal film formed thereon. In addition, in implementations where the protective film is an ion-conducting film, the ion-conducting film can be incorporated into the final battery structure reducing the complexity of the battery formation process. This reduces the complexity of the tool and subsequently reduces the cost of ownership.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. A method, comprising:
forming a lithium metal film on a current collector, the current collector comprising copper, stainless steel, or a combination thereof; and
forming a protective film stack on the lithium metal film, comprising:
forming a first protective film on the lithium metal film, wherein the first protective film is, a silver chalcogenide film; and
forming a second protective film on the first protective film, the second protective film selected from a metallic film, a carbon-containing film, or a combination thereof, wherein, when the second protective film comprises the carbon-containing film, the carbon-containing film is selected from a diamond-like carbon film or a graphene oxide film.

2. The method of claim 1, wherein the second protective film comprises the metallic film and the metallic film is selected from tin (Sn), antimony (Sb), bismuth (Bi), gallium (Ga), germanium (Ge), copper (Cu), silver (Ag), gold (Au), or a combination thereof.

3. The method of claim 1, wherein the second protective film is the metallic film.

4. The method of claim 1, wherein the second protective film is the carbon-containing film.

5. The method of claim 1, wherein the first protective film has a thickness of 100 nanometers or less.

6. The method of claim 1, further comprising exposing the current collector to a plasma treatment or corona discharge process to remove organic materials from exposed surfaces of the current collector prior to forming the lithium metal film on the current collector.

7. The method of claim 1, wherein forming the first protective film comprises performing at least one of a sputtering process, a thermal evaporation process, an e-beam evaporation process, and a chemical vapor deposition (CVD) process.

8. The method of claim 1, wherein forming the second protective film comprises performing at least one of a sputtering process, a thermal evaporation process, an e-beam evaporation process, and a chemical vapor deposition (CVD) process.

9. An anode electrode structure, comprising:
   a current collector comprising copper, stainless steel, or a combination thereof;
   a lithium metal film formed on the current collector; and
   a protective film stack formed on the lithium metal film, the protective film stack comprising:
      a first protective film formed on the lithium metal film, wherein—the first protective film is; and
      a second protective film formed on the first protective film, the second protective film selected from a metallic film, a carbon-containing film, or a combination thereof, wherein, when the second protective film comprises the carbon-containing film, the carbon-containing film is selected from a diamond-like carbon film or a graphene oxide film.

10. The anode electrode structure of claim 9, wherein the second protective film comprises the metallic film and the metallic film is selected from tin (Sn), antimony (Sb), bismuth (Bi), gallium (Ga), germanium (Ge), copper (Cu), silver (Ag), gold (Au), or a combination thereof.

11. The anode electrode structure of claim 9, wherein the second protective film is the metallic film.

12. An energy storage device, comprising:
   the anode electrode structure of claim 9;
   a cathode electrode structure; and
   a solid electrolyte film formed between the anode electrode structure and the cathode electrode structure.

13. The energy storage device of claim 12, wherein the solid electrolyte film is comprised of LiPON, doped variants of either crystalline or amorphous phases of $Li_7La_3Zr_2O_{12}$, doped anti-perovskite compositions, argyrodite compositions, lithium-sulfur-phosphorous materials, $Li_2S$—$P_2S_5$, $Li_{10}GeP_2S_{12}$, and $Li_3PS_4$, lithium phosphate glasses, $(1-x)$ LiI-$(x)Li_4SnS_4$, $xLiI$-$(1-x)Li_4SnS_4$, mixed sulfide and oxide electrolytes (crystalline LLZO, amorphous $(1-x)LiI$-$(x)Li_4SnS_4$ mixture, amorphous $xLiI$-$(1-x)Li_4SnS_4$), $Li_3S(BF_4)_{0.5}Cl_{0.5}$, $Li_4Ti_5O_{12}$, lithium doped lanthanum titanate (LATP), $Li_{2+2x}Zn_{1-x}GeO_4$, $LiTi_2(PO_4)_3$, $LiHf_2(PO_4)_3$, $LiGe_2(PO_4)_3$, or a combination thereof.

14. A method, comprising:
   forming a lithium metal film on a current collector, the current collector comprising copper, stainless steel, or a combination thereof; and
   forming a protective film stack on the lithium metal film, comprising:
      forming a first protective film on the lithium metal film, wherein the first protective film is a silver chalcogenide film; and
      forming a second protective film on the first protective film, wherein the second protective film is a metallic film.

15. The method of claim 14, wherein the first protective film has a thickness of 100 nanometers or less.

16. The method of claim 14, wherein the metallic film is selected from tin (Sn), antimony (Sb), bismuth (Bi), gallium (Ga), germanium (Ge), copper (Cu), silver (Ag), gold (Au), or a combination thereof.

17. The method of claim 14, further comprising exposing the current collector to a plasma treatment or corona discharge process to remove organic materials from exposed surfaces of the current collector prior to forming the lithium metal film on the current collector.

18. An anode electrode structure, comprising:
   a current collector comprising copper, stainless steel, or a combination thereof;
   a lithium metal film on the current collector; and
   a protective film stack on the lithium metal film, the protective film stack comprising:
      a first protective film on the lithium metal film, wherein the first protective film is a silver chalcogenide film; and
      a second protective film on the first protective film, wherein the second protective film is a metallic film.

19. The anode electrode structure of claim 18, wherein the metallic film is selected from tin (Sn), antimony (Sb), bismuth (Bi), gallium (Ga), germanium (Ge), copper (Cu), silver (Ag), gold (Au), or a combination thereof.

20. An energy storage device, comprising:
   the anode electrode structure of claim 18;
   a cathode electrode structure; and
   a solid electrolyte film positioned between the anode electrode structure and the cathode electrode structure.

* * * * *

UNITED STATES PATENT AND TRADEMARK OFFICE
CERTIFICATE OF CORRECTION

| | |
|---|---|
| PATENT NO. | : 11,631,840 B2 |
| APPLICATION NO. | : 16/658286 |
| DATED | : April 18, 2023 |
| INVENTOR(S) | : Subramanya P. Herle |

It is certified that error appears in the above-identified patent and that said Letters Patent is hereby corrected as shown below:

In the Specification

In Column 10, Line 67, delete "macrostructure." and insert -- macro structure. --.

In Column 13, Line 54, delete "macrostructure." and insert -- macro structure. --.

In the Claims

In Column 21, Line 17, in Claim 9, delete "wherein—the" and insert -- wherein the --.

In Column 21, Line 17, in Claim 9, delete "is;" and insert -- is a silver chalcogenide film; --.

Signed and Sealed this
Twenty-seventh Day of August, 2024

Katherine Kelly Vidal
*Director of the United States Patent and Trademark Office*